United States Patent [19]

Smith et al.

[11] 4,286,995

[45] Sep. 1, 1981

[54] MICA-FREE JOINT COMPOUND

[75] Inventors: Richard E. Smith, Williamsville; William R. Burke, Tonawanda, both of N.Y.

[73] Assignee: National Gypsum Company, Dallas, Tex.

[21] Appl. No.: 134,701

[22] Filed: Mar. 27, 1980

[51] Int. Cl.³ ............................................. C04B 11/00
[52] U.S. Cl. .................................................. 106/109
[58] Field of Search ...................... 106/109, 110, 111; 423/555

[56] References Cited

U.S. PATENT DOCUMENTS

| | | | |
|---|---|---|---|
| 3,891,453 | 6/1975 | Williams | 106/109 |
| 3,975,320 | 8/1976 | Lane et al. | 106/109 |
| 4,152,408 | 5/1979 | Winslow | 106/109 |

*Primary Examiner*—James Poer
*Attorney, Agent, or Firm*—Robert F. Hause

[57] ABSTRACT

A joint compound, having crack resistance substantially equal to joint compounds containing mica, wherein the mica has been replaced by low length to width ratio gypsum crystals formed by the hydration of calcium sulfate to calcium sulfate dihydrate, particularly crystals formed in the presence of citric acid.

10 Claims, No Drawings

MICA-FREE JOINT COMPOUND

This invention relates to a mica-free joint compound containing relatively flat substantially square gypsum crystals which have been formed by hydration of calcium sulfate to calcium sulfate dihydrate, such as crystals found in the presence of citric acid.

U.S. Pat. Nos. 3,975,320 and 4,049,866 disclose that calcium sulfate dihydrate which is formed as a by-product of the conventional fermentation processing of citric acid from preferably sugar but produces crystals having a peculiar twinned structure, which, when ground to alter the particle size distribution to certain defined ranges, may be employed in a joint compound to replace part or all of the commonly used mica, which is used to minimize shrinkage during drying.

The present invention relates to the use of a different form of calcium sulfate dihydrate crystal, as a replacement for mica in a joint compound, different from the material disclosed in the above '320 and '866 patents, and different from any other known prior calcium sulfate dihydrate. The novel material is produced by a hydration of calcium sulfate anhydrite to calcium sulfate dihydrate under certain conditions whereby the resultant material contains a large percentage of crystals of a low length to width ratio. The hydration product does not require any grinding or other alteration of particle size, however it is recognized that some further alteration of particle size might be found to provide a further improvement in the performance of the product.

It is an object of the invention to provide a novel ingredient for use in a joint compound for drywall construction.

It is a further object to provide a novel replacement for mica in a joint compound.

These and other objects and advantages will be more readily apparent when considered in relation to the preferred embodiments as set forth in the following specifications.

According to the present invention, a joint compound is prepared in which no mica is used, but in its place there is used a specially prepared calcium sulfate dihydrate which consists primarily of individual crystals having a very low length to width ratio.

Preferably the special calcium sulfate dihydrate is the end product of a hydration reaction of calcium sulfate anhydrite, wherein the anhydrite is hydrated in an aqueous solution containing from about ½% to 4% citric acid.

For example, the special calcium sulfate dihydrate is formed by, first, adding 8 parts sodium sulfate and 1 part citric acid to 91 parts of water. To this solution, 42.8 parts of calcium sulfate anhydrite is added. Also, about 1 part of crushed special calcium sulfate dihydrate from a previous hydration reaction is added, to act as seeds for starting new crystal growth. The temperature was maintained at 70° F.±2° F.

Hydration is substantially complete after about eight hours. The low length to width ratio calcium sulfate dihydrate crystals are then separated from the liquid by filtration. The crystals included a substantial portion having a length to width ratio of about 1.0 to 1.5, with the length being about 50 to 100μ.

The special calcium sulfate crystals were then used in one formulation of a joint compound containing no mica and compared with a similar joint compound containing no special calcium sulfate crystals, as follows:

| Ingredients | Containing Special Crystals | Without Special Crystals |
| --- | --- | --- |
| Water | 23.36 | 25.90 |
| Limestone | 59.00 | 66.84 |
| Bentonite Clay | 1.32 | 1.35 |
| Attapulgite Clay | 1.47 | 1.37 |
| Polyacrylamide Flocculant | .02 | .02 |
| Methyl Cellulose Thickener | .36 | .35 |
| Potassium Carbonate | .04 | .05 |
| Tributyl in Tin Preservative | .04 | .05 |
| Propylene Glycol | .37 | .36 |
| Polyvinyl Acetate Latex | 3.20 | 3.59 |
| Benzoflex 9-88 Plasticizer | .11 | .12 |
| Nopco 9201A Vegetable Oil Defoamer | .04 | — |
| Narvon Aluminum Silicate | 2.13 | — |
| Special Calcium Sulfate Dihydrate | 8.54 | — |

The limestone and the clays are basically fillers, however they also contribute to the working properties of the compound when applying the material onto a wall. The polyacrylamide flocculant causes flocculation of the attapulgite clay, to give the attapulgite clay its best working properties.

The potassium carbonate is a solvent for the thickener. The propylene glycol prevents thinner portions of the joint compound, as is common along the edge, from drying too fast, during application of the joint compound.

The latex acts as a binder, with the assistance of the plasticizer.

Defoamer is an optional ingredient in the above type formulas, and its presence has no effect on the crack resistance of the joint compound during drying. The Narvon aluminum silicate raises the consistency of the composition, resulting in lower solids, thus improving the working properties, but also has been found to increase somewhat the tendency of the compound to shrink during drying, forming shrinkage cracks.

The presence of the special low length to width ratio calcium sulfate dihydrate crystals in the one above formulation markedly overcame the tendencies of the joint compound to shrink during drying, resulting in substantially less shrinkage cracks forming, when applied relatively thickly to a surface, as compared to the joint compound of the above formulation having no special crystals of calcium sulfate dihydrate.

Having completed a detailed disclosure of the preferred embodiments of my invention so that those skilled in the art may practice the same, I contemplate that variations may be made without departing from the essence of the invention or the scope of the appended claims.

We claim:

1. A joint compound for concealing the joints between wallboards, consisting essentially of a filler, a binder, additives for providing working properties during application to a wallboard when mixed with water, and a special additive for minimizing shrinkage during drying, said special additive consisting of calcium sulfate dihydrate, said calcium sulfate dihydrate comprising a substantial portion of individual crystals having a length to width ratio of about 1.0 to 1.5, with the length being about 50 to 100μ.

2. A joint compound as defined in claim 1 wherein said calcium sulfate dihydrate has been formed by a hydration reaction in a aqueous solution containing about ½% to 4% citric acid.

3. A joint compound as defined in claim 2 wherein said hydration reaction consisted of adding calcium sulfate anhydrite to an aqueous solution of about ½% to 4% citric acid and about 2% to 10% sodium sulfate and maintaining the reaction at about 70° F. for about eight hours.

4. A joint compound as defined in claim 3, wherein said calcium sulfate dihydrate formed in said hydration reaction is separated from said solution and used without any further treatment.

5. A joint compound as defined in claim 1 which is free of mica.

6. A joint compound as defined in claim 1 wherein the joint compound consists essentially of a major portion of finely ground, inert, inorganic filler, a minor amount of a binder having the ability to contribute substantially to the binding together of all of the ingredients when the joint compound is applied to a wallboard when mixed with water, a minor portion of additives for providing working properties during application to a wallboard when mixed with water, and said special additive for minimizing shrinkage during drying.

7. A joint compound as defined in claim 6 wherein said calcium sulfate dihydrate has been formed by a hydration reaction in an aqueous solution containing about ½% to 4% citric acid.

8. A joint compound as defined in claim 7 wherein said hydration reaction consisted of adding calcium sulfate anhydrite to an aqueous solution of about ½% to 4% citric acid and about 2% to 10% sodium sulfate and maintaining the reaction at about 70° F. for about eight hours.

9. A joint compound as defined in claim 8, wherein said calcium sulfate dihydrate formed in said hydration reaction is separated from said solution and used without any further treatment.

10. A joint compound as defined in claim 6 which is free of mica.

* * * * *